United States Patent [19]

Paek et al.

[11] Patent Number: 4,539,226

[45] Date of Patent: Sep. 3, 1985

[54] HIGH SPEED LIGHTGUIDE COATING APPARATUS

[75] Inventors: Un C. Paek, West Windsor Township, Mercer County; Charles M. Schroeder, Jr., North Hanover Township, Burlington County, both of N.J.

[73] Assignee: AT&T Technologies, Inc., New York, N.Y.

[21] Appl. No.: 585,659

[22] Filed: Mar. 2, 1984

[51] Int. Cl.³ .................. B05D 5/06; B05D 1/18; G02B 5/14
[52] U.S. Cl. .................. 427/163; 427/169; 427/434.5; 118/405; 118/420
[58] Field of Search .............. 118/405, 420, DIG. 18, 118/DIG. 19, 50, 429; 427/163, 165, 169, 434.5, 434.6; 65/3.11, 3.13, 3.4

[56] References Cited

U.S. PATENT DOCUMENTS

| | | | |
|---|---|---|---|
| 3,473,511 | 10/1969 | Metz et al. | 118/50 |
| 4,349,587 | 9/1982 | Aloisio, Jr. et al. | 427/163 |
| 4,374,161 | 2/1983 | Geyling et al. | 427/160 |
| 4,409,263 | 10/1983 | Aloisio, Jr. et al. | 427/163 |
| 4,439,467 | 3/1984 | Kassahun et al. | 427/163 |

FOREIGN PATENT DOCUMENTS 2048726 12/1980 United Kingdom .............. 118/405

Primary Examiner—Norman Morgenstern
Assistant Examiner—Kenneth Jaconetty
Attorney, Agent, or Firm—D. J. Kirk

[57] ABSTRACT

An apparatus for applying a coating on a lightguide fiber (60). The apparatus is comprised of a container (10) having the coating die (18) in the bottom portion thereof and a plurality of separating means (26—26) therein which divides the container into an upper chamber (12), a lower chamber (16) and at least one chamber (14) intermediate to the upper and lower chambers. Each separating means (26) is sealed to the inner surface of the container (10) at the outer edge portion and has a small, centrally located aperture (28) which is vertically aligned with the apertures in the other separating means and the coating die (18). Additionally, a means is provided for directing coating material (40), under pressure, into the lower chamber (16).

4 Claims, 1 Drawing Figure

U.S. Patent  Sep. 3, 1985  4,539,226
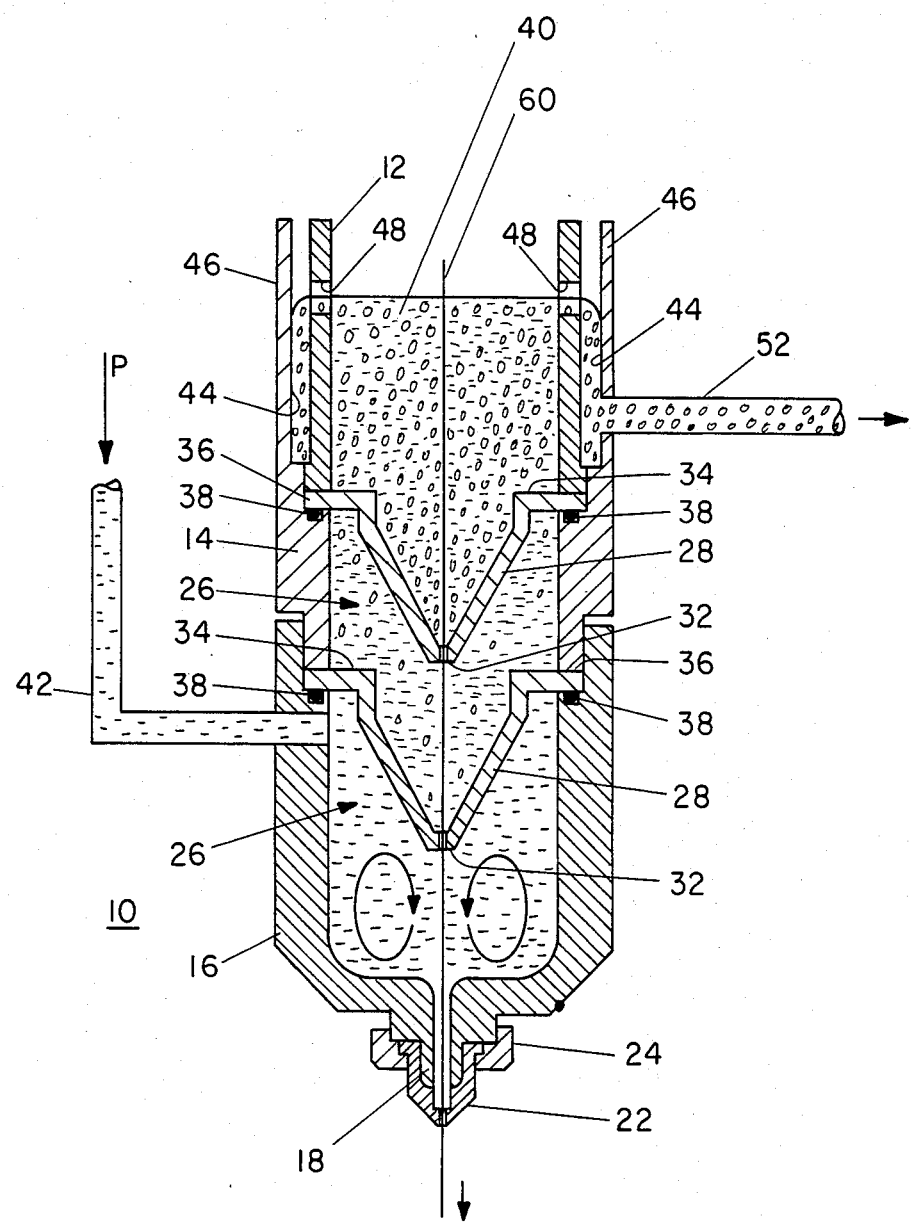

HIGH SPEED LIGHTGUIDE COATING APPARATUS

TECHNICAL FIELD

This invention relates to methods of and apparatus for coating elongated material. More particularly, it relates to methods of and apparatus for applying a layer of a substantially bubble-free coating material concentrically about a lightguide fiber.

BACKGROUND OF THE INVENTION

The successful implementation of a lightwave communication system requires the manufacture of high quality lightguide fibers having mechanical properties sufficient to withstand stresses to which they are subjected. Typically, the fiber has an outside diameter of 0.125 mm and is drawn from a glass preform having an outer diameter of 17 mm. Each fiber must be capable of withstanding over its entire length a maximum stress level which the fiber will encounter during installation and service. The important of fiber strength becomes apparent when one considers that a single fiber failure will result in the loss of several hundred circuits.

The failure of lightguide fibers in tension is commonly associated with surface flaws which cause stress concentrations and lower the tensile strength from that of the pristine unflawed glass. The size of the flaw determines the level of stress concentration and, hence, the failure stress. Even micron-sized surface flaws cause stress concentrations which significantly reduce the tensile strength of the fibers.

Long lengths of lightguide fibers have considerable potential strength but the strength is realized only if the fiber is protected with a layer of a coating material such as a polymer, for example, soon after it has been drawn from a preform. This coating serves to prevent airborne particles from impinging upon and adhering to the surface of the drawn fiber which would serve to weaken it. Also, the coating shields the fiber from surface abrasion, which could be inflicted by subsequent manufacturing processes and handling during installation, provides protection from corrosive environments and spaces the fibers in cable structures.

In one well known process, the coating material is applied by advancing the lightguide fiber through a reservoir in an open cup applicator containing a liquid polymer material. Typically, the fiber enters the reservoir through a free surface, and exits through a relatively small die orifice at the bottom of the reservoir. The coating material is the cured and the coated fiber taken up by a suitable capstan.

Uniform wetting of the fiber during the coating process is largely affected by the behavoir of an entrance meniscus which exists where the fiber is advanced through the free surface of the coating material in the reservoir. As is well known, the wetting characteristics of two materials such as a coating and glass, depend on the fiber temperature entering the reservoir, surface tension and chemical bonds which are developed between the two materials.

The wetting characteristics are affected by a pumping of air into the meniscus. During the coating process, both the fiber surface and the polymer surface are moving at a relatively high speed. The moving surfaces shear the surrounding air, causing it to flow into the point of the meniscus. The drawn fiber pulls a considerable amount of air into the coating material as it enters the free surface of the reservoir. Thus in the coating applicator, the entrance meniscus is drawn down with the moving fiber, instead, of rising along its surface as it does under static conditions.

It has been found that as the draw rate exceeds about 0.2 meter per second, which is less than the commonly used rate of approximately one meter per second, this pumping action causes the meniscus to extend downwardly and develop essentially into a long, thin column of air which surrounds the fiber and is confined by surface tension in the coating material. Tests have shown that the drag force is sufficiently high to sustain a column of air of considerable depth.

Air entrainment in the form of bubbles on the moving fiber occurs as relatively thin packets of air break off from the column and are carried along with the fiber on its surface. They remain on the fiber, resembling a skin, until they reach a region of pressure gradient in the vicinity of the die opening where they are compressed. This causes the air packets to bulge and form bubbled which may be removed by surrounding flow lines leading away from the fiber. Should an air packet be compressed farther downstream where all the flow lines extend out of the die with the fiber, the bubble can exit along with the fiber. As the quantity of these bubbles increases, more tend to pass through the die and remain in the coating on the fiber.

As the draw speed is increased, the meniscus becomes unstable, oscillating between a fully developed state with circulation and a relatively small one with little or no circulation. At higher speeds, the column can extend completely through the polymer coating material. In such case, the fiber no longer contacts the polymer, the meniscus collapses and the fiber undesirably exits the die with no coating material or with an intermittent, beaded coating.

One method directed to solving these problems is described in U.S. Pat. No. 4,409,263 to Aloisio, Jr. et al. wherein the fiber is advanced through a continuum of coating material, which extends from a free surface of a reservoir and through first and second dies that are arranged in tandem, at a velocity which causes air to be entrained in the coating material. A pressure gradient is established between portions of the first die adjacent to its exit orifice. The first die communicates with the reservoir and is spaced from the second die to provide a chamber which communicates with a pressurized supply of the coating material. The pressurized flow enhances the pressure gradient in the first die and establishes sufficient volumetric flow of coating material upwardly through the first die to cause bubbles in the coating material on the advancing fiber to be removed. Although such a technique is able to coat fibers at speeds of up to 9 meters per second at drawn speeds between approximately 5 to 9 meters per second, the strength of the fiber has been found to be quite low.

Various other techniques provide upper and lower sections through which the fibers are drawn wherein the lower section is pressurized by external connections and devices. Although such techniques have met with varying degrees of success, there still appears to be a need for methods and apparatus which substantially reduce, if not eliminate bubbles in the coating material in an economically efficient manner. Additionally, it is desired that the fiber be coated at a high speed (e.g., equal to or greater than 10 meters per second) while maintaining the strength of the fiber.

SUMMARY OF THE INVENTION

The foregoing problems have been overcome by the instant technique for coating lightguide fibers. The method comprises the steps of drawing the fiber through a container, filled with coating material, having at least three vertically aligned chambers therein, each chamber being sealed from the others and each having a small aperture in the lower portion thereof through which the fiber is drawn. The lower chamber being pressurized higher than the chambers thereabove.

BRIEF DESCRIPTION OF THE DRAWINGS

The sole FIGURE in the drawing depicts the instant coating apparatus.

DETAILED DESCRIPTION

An exemplary embodiment of the instant invention is depicted as apparatus generally designated by the numeral 10 in the FIGURE. The apparatus 10 is comprised of upper, intermediate and lower chambers 12, 14 and 16, respectively. The lower chamber 16 has a downwardly extending snout 18 in the lower portion thereof and a die member 22 is positioned thereabout and held in place by a locking member 24. The upper and intermediate chambers 12 and 14 have a separating member 26 in the bottom portion thereof. Each member 26 has a conical central portion 28 terminating in a small opening 32 and a laterally extending section 34 which is seated on a shoulder 36 of the lower and intermediate chambers 16 and 14, respectively. An "O" ring 38 captured between the laterally extending sections 34—34 and the shoulders 36—36 provides a seal between the chambers. The separating members 26—26 may be securely fastened to the shoulders 36—36 or the chamber walls by well known mechanical means.

The lower chamber 16 is connected to a pressurized source (not shown) of coating material 40 by a conduit 42. Additionally, an annular trough 44 is formed between an extended portion 46 of the intermediate chamber 14 and the outside wall of the upper chamber 12. The upper chamber 12 has a plurality of apertures 48—48 and a pipe 52 communicates with the annular trough 44.

In operation, the chambers 12, 14 and 16 are filled with the polymer coating material 40 and a lightguide fiber 60 fed through the openings 32—32 and the die member 18. The pressure, P, of the coating material 40 in the conduit 42 is then adjusted until the material in the upper chamber 12 continuously flows through the apertures 46—46 into the annular trough 44 and out the pipe 52 to a reservoir (not shown). As the fiber 60 is being drawn through the apparatus 10 the pressure, P, may be continuously adjusted to keep the pressure in the lower chamber 16 higher than the chambers thereabove which substantially precludes the migration of bubbles from the intermediate chamber 14 into the lower chamber 16. Additionally, this will also cause the pressure in the intermediate chamber 14 to be higher than that of the upper chamber 12 which will minimize the flow of buffles therebetween.

There will be a slight flow of the coating material through the openings 32—32 in a direction opposite to that of the movement of the fiber 60 which encourages bubbles to flow towards or stay in the upper chamber 12 where they will be continuously removed along with the material overflowing through the apertures 48—48 into the trough 44, through the pipe 52 and into the reservoir.

Advantageously, the use of an intermediate chamber 14 provides a buffer between the upper and lower chambers 12 and 16, respectively. Such a buffer appears to substantially assist in precluding the passage of bubbles in the upper chamber 12 into the lower chamber 16 resulting in a high strength fiber coated at high velocities.

In the embodiment of the sole FIGURE of the drawings, the openings 32—32 are circular and have a diameter of one mm while the die member 18 has an opening diameter of 325 $\mu$m. The pressure, P, was approximately 15 to 20 psi when a fiber 60 of 125 $\mu$m in diameter was continuously coated at approximately 10 minutes per second with a substantially uniform coating thickness of 50 $\mu$m for lengths of greater than 15 kilometers.

Additionally, the coated fiber 60 maintained a high strength of approximately 830,000 psi. For example, fibers 60 coated using the instant technique averaged only a single break in lengths of coated fiber over 7 kilometers at a tension of approximately 200,000 psi.

It is to be understood that the embodiments described herein are merely illustrative of the principles of the invention. Various modifications may be made thereto by persons skilled in the art which will embody the principles of the invention and fall within the spirit and scope thereof. For instance, although the instant coating apparatus 10 has only a single intermediate chamber 14 shown it is clear that a plurality of such intermediate chambers may be effectively implemented.

What is claimed is:

1. A method of coating a lightguide fiber, comprising the steps of:
    drawing the fiber through a container, filled with coating material, having at least three vertically aligned chambers therein, each chamber being sealed from the others and each having a small aperture in the lower portion thereof through which the fiber is drawn; and
    pressurizing the lower chamber to a pressure higher than the chambers thereabove wherein the pressure in the lower chamber causes the coating material to continuously flow upward, through the apertures in the lower portions of the chambers thereabove, and out an overflow means in the upper chamber.

2. An apparatus for coating a lightguide fiber, which comprises:
    a container, having a coating die in the bottom portion thereof, and a plurality of separating means therein which divides the container into an upper chamber, a lower chamber and at least one chamber intermediate to the upper and lower chambers, said chambers being adapted to contain coating material therein;
    each separating means is sealed to the inner surface of the container at the outer edge portion and has a small, centrally located aperture which is vertically aligned with the apertures in the other separating means and the coating die; and
    a means for directing coating material, under pressure, into the lower chamber.

3. The apparatus as set forth in claim 2, wherein:
    each separating means is conically shaped with the aperture at its apex.

4. The apparatus as set forth in claim 2, wherein:
    the upper chamber is adapted to permit the coating material to overflow therefrom.

* * * * *